(12) United States Patent
Salter et al.

(10) Patent No.: US 11,186,180 B2
(45) Date of Patent: Nov. 30, 2021

(54) VEHICLE INCLUDING REMOTE TERMINALS CONNECTED TO BATTERY SO AS TO PREVENT ELECTRONIC TAMPERING

(71) Applicant: Ford Global Technologies, LLC, Dearborn, MI (US)

(72) Inventors: Stuart C. Salter, White Lake, MI (US); David Brian Glickman, Southfield, MI (US); Paul Kenneth Dellock, Northville, MI (US); Peter Phung, Windsor (CA); Zeljko Deljevic, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 174 days.

(21) Appl. No.: 16/682,053

(22) Filed: Nov. 13, 2019

(65) Prior Publication Data
US 2021/0138908 A1    May 13, 2021

(51) Int. Cl.
| | | |
|---|---|---|
| *B60L 3/04* | (2006.01) | |
| *B60L 3/00* | (2019.01) | |
| *H01M 50/543* | (2021.01) | |
| *H01M 50/572* | (2021.01) | |
| *H01M 10/44* | (2006.01) | |
| *H02J 7/00* | (2006.01) | |
| *H01M 10/48* | (2006.01) | |

(52) U.S. Cl.
CPC .............. *B60L 3/04* (2013.01); *B60L 3/0046* (2013.01); *H01M 10/44* (2013.01); *H01M 10/48* (2013.01); *H01M 50/543* (2021.01); *H01M 50/572* (2021.01); *H02J 7/0031* (2013.01); *H02J 7/0047* (2013.01); *H01M 2220/20* (2013.01); *H02J 7/0048* (2020.01)

(58) Field of Classification Search
CPC .. B60L 3/04; B60L 3/0044; B60L 3/00; B60L 3/0046; H01M 50/543; H01M 50/572; H01M 10/44; H01M 10/48; H01M 2220/20; H02J 7/0047; H02J 7/0031; H02J 7/0048; H02J 7/00
See application file for complete search history.

(56) References Cited

U.S. PATENT DOCUMENTS

| | | | | |
|---|---|---|---|---|
| 4,185,204 A | * | 1/1980 | Fima | H02G 3/14 307/10.1 |
| 4,807,895 A | * | 2/1989 | Thomas | H02G 3/00 180/68.5 |
| 5,013,259 A | * | 5/1991 | Maurer | H01R 11/288 439/504 |
| 7,364,457 B2 | | 4/2008 | Mehki | |

(Continued)

FOREIGN PATENT DOCUMENTS

KR      100494588 B1    12/2004

*Primary Examiner* — Vuthe Siek
(74) *Attorney, Agent, or Firm* — David Coppiellie; Carlson, Gaskey & Olds, P.C.

(57) ABSTRACT

This disclosure relates to a motor vehicle including remote terminals connected to battery so as to prevent electronic tampering, and a corresponding method. An example vehicle includes a battery with battery terminals. The vehicle further includes remote terminals electronically connected to the battery terminals so as to prevent electronic tampering with the battery via the remote terminals.

15 Claims, 3 Drawing Sheets

(56) References Cited

U.S. PATENT DOCUMENTS

| | | | |
|---|---|---|---|
| 7,697,253 B1* | 4/2010 | Maraval | B66C 1/08 |
| | | | 361/144 |
| 2006/0232901 A1 | 10/2006 | Bierbaum et al. | |
| 2010/0076706 A1* | 3/2010 | Elder | H01M 10/122 |
| | | | 702/63 |
| 2015/0217656 A1* | 8/2015 | Loftus | B60L 53/16 |
| | | | 320/136 |
| 2016/0314454 A1* | 10/2016 | Balar | H01M 10/4257 |
| 2018/0251037 A1 | 9/2018 | Alvarez Ruiz et al. | |
| 2020/0189405 A1* | 6/2020 | Westfall | B60L 53/16 |
| 2021/0021295 A1* | 1/2021 | Yun | H04B 1/401 |

* cited by examiner

VEHICLE INCLUDING REMOTE TERMINALS CONNECTED TO BATTERY SO AS TO PREVENT ELECTRONIC TAMPERING

TECHNICAL FIELD

This disclosure relates to a motor vehicle including remote terminals connected to battery so as to prevent electronic tampering, and a corresponding method.

BACKGROUND

Batteries of both internal combustion-powered and electric-powered vehicles may become depleted of electrical charge. In these circumstances, vehicles can be jump started using jumper cables. Specifically, the battery of a first vehicle which supplies the electrical charge is electronically connected to the depleted battery of a second vehicle. The first vehicle is turned on to deliver current to the battery of the second vehicle, during which time the second vehicle can be turned on.

SUMMARY

A motor vehicle according to an exemplary aspect of the present disclosure includes, among other things, a battery including battery terminals, and remote terminals electronically connected to the battery terminals so as to prevent electronic tampering with the battery via the remote terminals.

In a further non-limiting embodiment of the foregoing motor vehicle, the vehicle includes a sensor configured to generate an output indicative of a direction of current flowing between the battery terminals and the remote terminals.

In a further non-limiting embodiment of any of the foregoing motor vehicles, the sensor is a Hall effect sensor.

In a further non-limiting embodiment of any of the foregoing motor vehicles, the vehicle includes a controller electronically connected to the sensor. Further, the controller is configured to perform at least one step when the output from the sensor indicates current is flowing out of the battery via the remote terminals.

In a further non-limiting embodiment of any of the foregoing motor vehicles, the at least one step includes issuing a prompt informing a user that current is flowing out of the battery, and receiving an input from the user regarding whether discharging of the battery is authorized.

In a further non-limiting embodiment of any of the foregoing motor vehicles, when the controller receives an input indicating that discharging of the battery is authorized, the controller monitors a state of charge of the battery relative to a low state of charge threshold.

In a further non-limiting embodiment of any of the foregoing motor vehicles, when the state of charge of the battery meets or falls below the threshold, the controller is configured to perform at least one (1) issuing a prompt to a user indicating a low battery state of charge and (2) electronically disconnecting the remote terminals from the battery terminals.

In a further non-limiting embodiment of any of the foregoing motor vehicles, when the controller receives an input indicating that discharging of the battery is not authorized, the at least one step includes one or more of (1) activating an alarm of the motor vehicle, (2) recording images of an area around the vehicle, (3) sending an alert to a user, and (4) sending an alert to authorities.

In a further non-limiting embodiment of any of the foregoing motor vehicles, the vehicle includes a switch between the remote terminals and the battery terminals, and the at least one step includes opening the switch to electronically disconnect the remote terminals and the battery terminals.

In a further non-limiting embodiment of any of the foregoing motor vehicles, the at least one step includes determining whether a user of the vehicle is within a predetermined range of the vehicle.

In a further non-limiting embodiment of any of the foregoing motor vehicles, the controller determines whether the user is within the predetermined range of the vehicle by locating a mobile device of the user or a keyfob.

In a further non-limiting embodiment of any of the foregoing motor vehicles, the vehicle includes an electronic circuit between the remote terminals and the battery terminals, wherein the electronic circuit is configured to prevent backfeeding of current from the battery to the remote terminals and protect the battery from a voltage spike.

In a further non-limiting embodiment of any of the foregoing motor vehicles, the electronic circuit includes a diode configured to prevent backfeeding of current from the battery to the remote terminals, and the electronic circuit includes at least one electronic component configured to protect the battery from a voltage spike.

In a further non-limiting embodiment of any of the foregoing motor vehicles, the at least one electronic component configured to protect the battery from a voltage spike includes at least one of a circuit breaker and a Zener diode.

In a further non-limiting embodiment of any of the foregoing motor vehicles, the battery terminals includes a positive terminal and a negative terminal, the remote terminals includes a remote positive terminal and a remote negative terminal, the remote positive terminal is electronically connected to a first node of the electronic circuit via a first branch, a first circuit breaker is arranged in the first branch, the diode configured to prevent backfeeding of current from the battery is arranged in a second branch between the first node and the positive terminal of the battery, the negative terminal of the battery is electronically connected to a second node via a third branch, a second circuit breaker is arranged in the third branch, the first and second nodes are connected by a fourth branch including a Zener diode configured to direct current to ground without flowing to the battery when a Zener voltage is exceeded, the Zener voltage exceeds the battery voltage.

In a further non-limiting embodiment of any of the foregoing motor vehicles, the vehicle is configured to be jump started via the remote terminals.

In a further non-limiting embodiment of any of the foregoing motor vehicles, the vehicle includes a cover configured to move between an open position and a closed position, and the remote terminals are arranged in a recess beneath the cover.

In a further non-limiting embodiment of any of the foregoing motor vehicles, the cover is arranged adjacent a rear edge of a hood of the motor vehicle.

A method according to an exemplary aspect of the present disclosure includes, among other things, preventing electronic tampering with a battery via remote terminals electronically connected to terminals of the battery.

In a further non-limiting embodiment of the foregoing method, the preventing step includes one or both of: (1)

preventing backfeeding of current from the battery to the remote terminals and (2) protecting the battery from a voltage spike.

DETAILED DESCRIPTION

This disclosure relates to a motor vehicle including remote terminals connected to battery so as to prevent electronic tampering, and a corresponding method. This disclosure provides convenient access to the battery terminals via the remote terminals while preventing tampering with the battery. These and other benefits will be appreciated from the below description.

Figure 1:
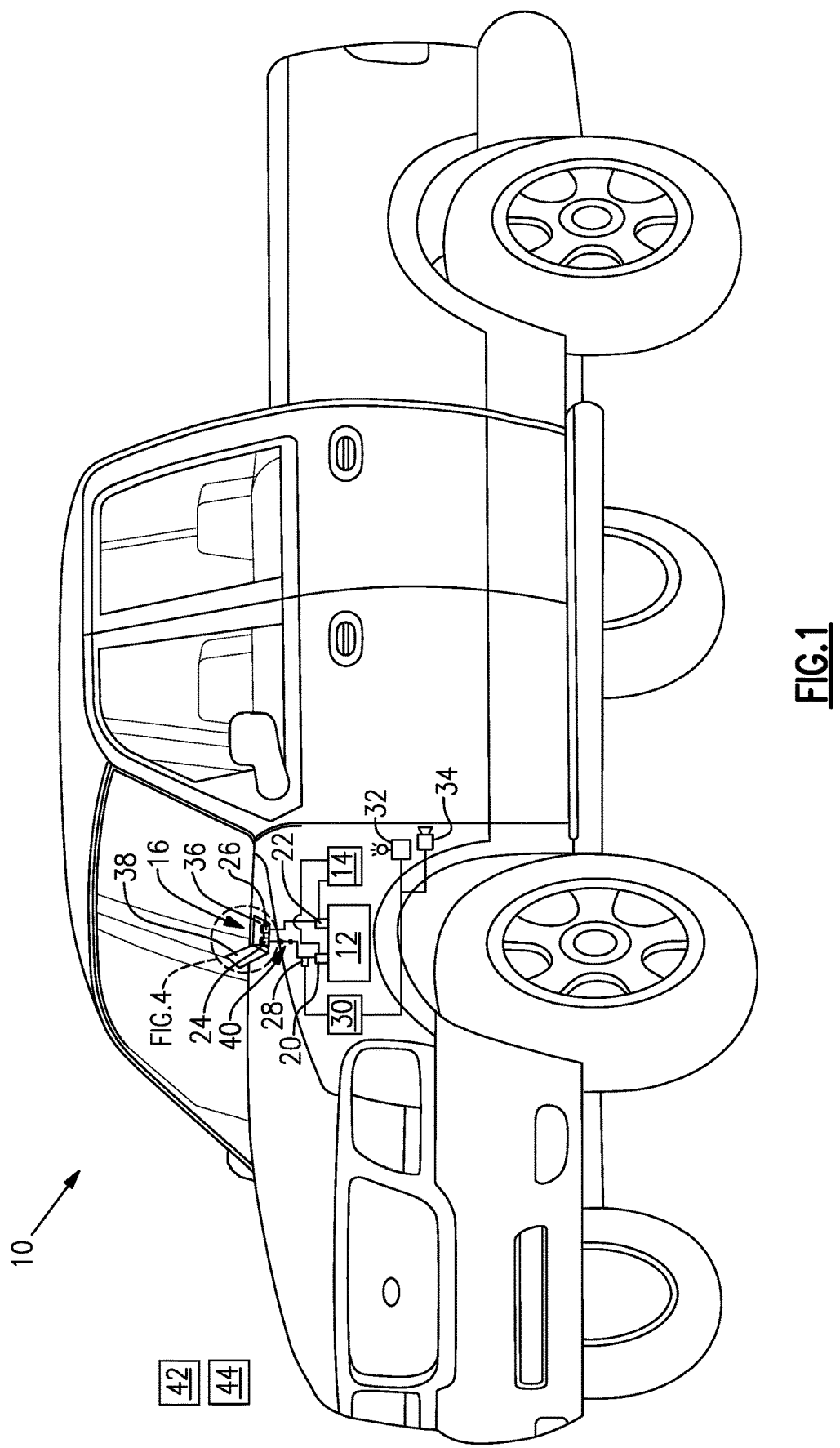
FIG. 1 is a front perspective view of an example motor vehicle.

FIG. 1 illustrates a motor vehicle 10 ("vehicle 10") including a battery 12, which in this example is a 12 Volt battery. The vehicle 10 may have an internal combustion engine or be an electrified vehicle, such as a hybrid electric vehicle (HEV), powered at least in part by one or more electric machines. Further, while the vehicle 10 is depicted as a pickup truck, this disclosure is not limited to any particular vehicle type and extends to sedans, vans, SUVs, etc.

The battery 12 is rechargeable and is configured to deliver current to various loads, which include components of the vehicle 10 such as a starter 14. The vehicle 10 further includes remote terminals 16 electronically connected to terminals of the battery 12. The vehicle 10 may be jump started via the remote terminals 16 or by the terminals of the battery 12. Unlike the terminals of the battery 12, however, the remote terminals 16 are accessible without lifting a hood 18 of the vehicle 10. Thus, the vehicle 10 can be jump started even when the hood cannot be unlatched, which is particularly beneficial in the context of vehicles that unlatch the hood electronically.

The battery 12 includes a positive terminal 20 and a negative terminal 22, and the remote terminals 16 include a remote positive terminal 24 and a remote negative terminal 26. Again, the terminals 20, 22 of the battery 12 are not accessible without lifting the hood 18. The remote terminals 16 on the other hand are spaced-apart from the terminals 20, 22 of the battery 12 and are accessible without lifting the hood 18. In this example, the remote terminals 16 are arranged adjacent a rear edge of the hood 18, but the remote terminals 16 may be arranged elsewhere on the vehicle 10.

The terminals 20, 22 of the battery 12 are electronically connected to the remote terminals 16 via one or more of cables, wires, busbars, and/or an electronic circuit. The remote terminals 16 are metallic posts or lugs, in this example, and are configured to attach to the clamps of jumper cables.

The battery 12 is connected to the remote terminals 16 in a way that prevents electronic tampering with the battery 12 via the remote terminals 16. In this disclosure, electronic tampering means any electronic interference with the remote terminals 16 that may cause damage to the battery 12 and/or the vehicle 10. Examples of electronic tampering including shorting the remote terminals 16 by connecting them directly to one another, unauthorized discharging of the battery 12 via the remote terminals, and introducing a voltage spike to the remote terminals 16. Electronic tampering may be intentional or unintentional. Accordingly, in this disclosure, the battery 12 may be connected to the remote terminals 16 in a manner that prevents backfeeding of current from the battery 12 to the remote terminals 16 and/or protects the battery 12 from a voltage spike.

In one aspect of this disclosure, the vehicle 10 includes a sensor 28 configured to generate an output indicative of a direction of current flowing between the terminals 20, 22 and the remote terminals 16. The sensor 28 may be Hall effect sensor in one example. The sensor 28 is arranged between the positive terminal 20 of the battery 12 and the remote positive terminal 24, in this example. The sensor 28 could be arranged elsewhere, such as between the negative terminal 22 of the battery 12 and the remote negative terminal 26.

The sensor 28 is electronically connected to a controller 30, in this example, which is configured to perform at least one step when the output from the sensor indicates current is flowing out of the battery 12 via the remote terminals 16. In other words, the controller 30 is configured to take one or more actions when the output of the sensor 28 indicates that the battery 12 is discharging.

In a particular aspect of this disclosure, the controller 30 is in electronic communication with a transceiver 32, such as a Bluetooth low-energy (BLE) transceiver, and a camera 34, such as a video camera. Further, the remote terminals 16 are arranged in a recess 36 which is selectively covered by a cover 38, in this example. The controller 30 is also configured to determine when the cover 38 is opened. An example arrangement of the remote terminals 16 relative to the recess 36 and cover 38 will be discussed in detail below.

The controller 30 is configured to receive information from the various components of the vehicle 10 and is configured to interpret that information and issue commands to the components of the vehicle 10 based on that information. The controller 30 is shown schematically in FIG. 1. It should be understood that the controller 30 may include hardware and software, and could be part of an overall vehicle control module, such as a body control module (BCM) or vehicle system controller (VSC), or could alternatively be a stand-alone controller separate from the BCM or VSC. Further, the controller 30 may be programmed with executable instructions for interfacing with and operating the various components of the vehicle 10. The controller 30 additionally includes a processing unit and non-transitory memory for executing the various control strategies and modes of the vehicle system.

Figure 2:
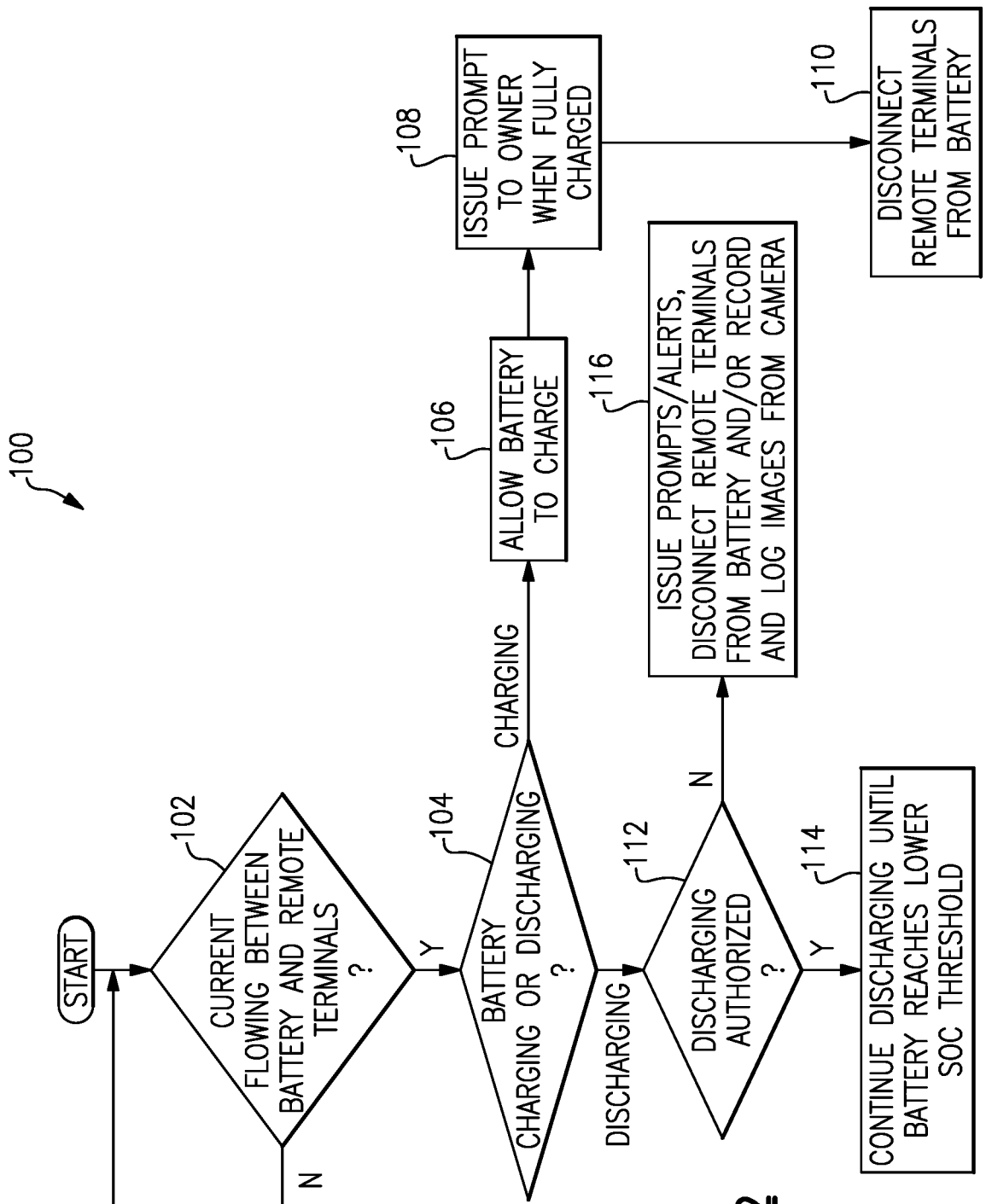
FIG. 2 is flow chart representative of an example method.

FIG. 2 is representative of an aspect of a method 100 according to this disclosure. In the method 100, the controller 30 determines, at 102, based on the output of the sensor 28, that current is flowing between the battery 12 and the remote terminals 16. The controller 30 next determines, at 104, whether the battery 12 is charging or discharging via the remote terminals 16. If the battery 12 is charging, then at 106 the controller 30 permits the battery 12 to charge until the battery 12 is fully charged. When fully charged, the controller 30 will issue a prompt to a user, at 108, and electronically disconnect the remote terminals 16 from the battery 12, at 110. The controller 30 may issue commands to one or more switches arranged between the battery 12 and remote terminals 16 to electronically disconnect the battery and the remote terminals. An example switch 40 is illustrated between the positive terminal 20 of the battery 12 and the remote positive terminal 24 in FIG. 1. The switch 40 is any type of electronic switch. The switch 40 may be a semiconductor device such as a MOSFET, in another example.

If, at 104, the controller 30 determines that the battery 12 is discharging, then the controller 30 determines, at 112, whether the discharging is authorized. Discharging may be authorized, for example, when a user wishes to jump start another vehicle by connecting jumper cables to the remote terminals 16. The controller 30 may determine that discharging is authorized by issuing a prompt to a mobile device 42 of the user, such as a cell phone, via SMS text or an application such as FordPass, as examples. The prompt may also be issued within the vehicle to the user via a human-machine interface of a vehicle infotainment system such as the Ford Sync system. The prompt may ask the user whether discharging is authorized. The prompt may permit the user to respond with an input indicating whether discharging is authorized, namely a "yes" or "no." The controller 30 is configured to receive the user's response to determine whether discharging is authorized.

In another example, the controller 30 determines whether the user is within a predetermined range of the vehicle 10, such as 15 feet, by locating a token 44 such as a keyfob or the mobile device 42 using the transceiver 32. The token 44 may be another type of locating device, such as an RFID chip or a BLE beacon. If the user is within the predetermined range, the controller 30 assumes that discharging is authorized. If not, the controller 30 may either assume that discharging is not authorized or may issue prompts, as discussed above, to determine whether discharging is authorized.

If discharging is authorized, then at 114 discharging continues until the battery 12 reaches a low state of charge (SOC) threshold. At that point, the controller 30 may issue a prompt to the user indicating that that battery 12 SOC is relatively low, and permit the user to respond to the prompt with an input indicating whether discharging should be stopped. Alternatively, the controller 30 may simply stop discharging by electronically disconnecting the battery 12 from the remote terminals 16 by opening the switch 40, for example.

If discharging is not authorized, then at 116 the controller 30 may take one or more steps, including (1) activating an alarm of the vehicle 10, (2) recording an area around the vehicle using the camera 34 and saving images and/or video both before and after the unauthorized discharging, (3) sending an alert/prompt to a user via their mobile device 42 or a vehicle infotainment system, (4) sending an alert to authorities such as the local police, including providing the police with the GPS coordinates of the vehicle 10 and the images from the camera 34, as examples, and/or (5) electronically disconnecting the battery 12 from the remote terminals 16.

Figure 3:
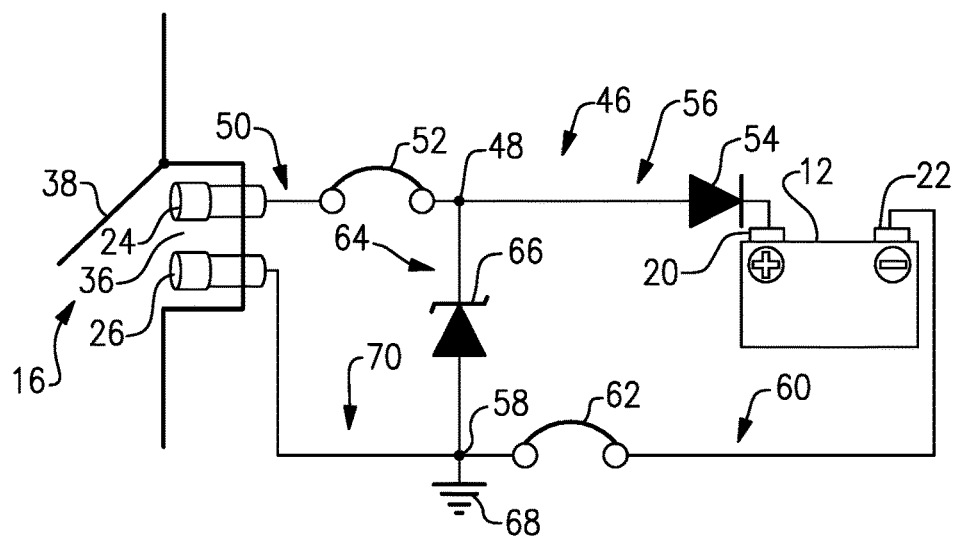
FIG. 3 schematically illustrates an exemplary electronic circuit between remote terminals and battery terminals.

FIG. 3 schematically illustrates a further embodiment of the present disclosure. In FIG. 3, the vehicle 10 includes an electronic circuit 46 between the remote terminals 16 and the terminals 20, 22. The electronic circuit 46 is configured to prevent backfeeding of current from the battery 12 to the remote terminals 16 and to protect the battery 12 from a voltage spike. The electronic circuit 46 may be used in addition to or in place of the sensor 28.

In FIG. 3, the remote positive terminal 24 is electronically connected to a first node 48 of the electronic circuit 46 via a first branch 50, and a first circuit breaker 52 is arranged in the first branch 50. Further, a diode 54 configured to prevent backfeeding of current from the battery 12 is arranged in a second branch 56 between the first node 48 and the positive terminal 20 of the battery 12. The negative terminal 22 of the battery 12 is electronically connected to a second node 58 via a third branch 60, and a second circuit breaker 62 is arranged in the third branch 60. The first and second nodes 48, 58 are connected by a fourth branch 64 including a Zener diode 66 configured to direct current to ground 68 without flowing to the battery 12 when a Zener voltage is exceeded. The Zener voltage exceeds the voltage of the battery 12, and in one example is 40 Volts. The circuit breakers 52, 62 and Zener diode 66 protect the battery 12 from voltage spikes. The remote negative terminal 26 is electronically connected to the second node 58 via a fifth branch 70 to complete the circuit.

While a particular diode 54 is shown in FIG. 1, there could alternatively or additionally be a diode arranged in the third branch 60 which is also configured to prevent backfeeding, for example. Further, the circuit breakers 52, 62 are not necessary in all examples. When present, the circuit breakers 52, 62 may be arranged in different locations. For instance, the circuit breaker 52 could be in the second branch 56, and the circuit breaker 62 could be in the fifth branch 70. While a particular electronic circuit has been shown and described relative to FIG. 3, this disclosure extends to other electronic circuits that perform one or both of the functions of preventing backfeeding and protecting the battery 12 from voltage spikes.

Figure 4:
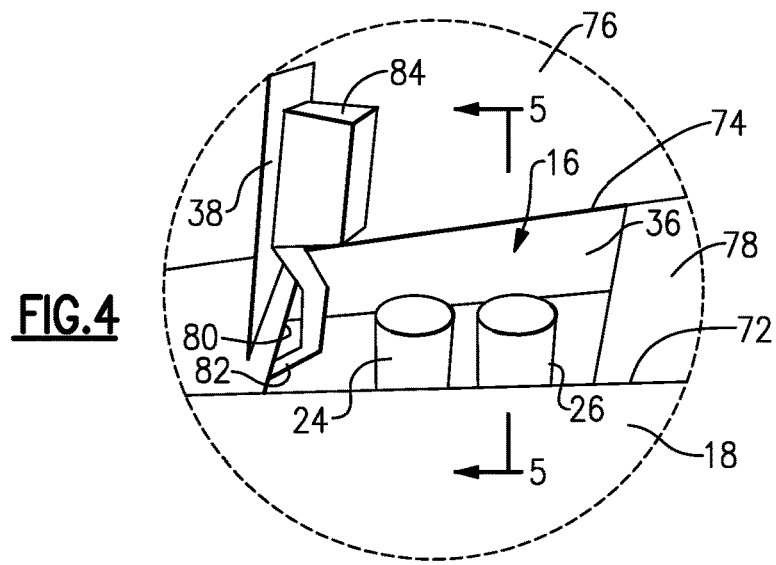
FIG. 4 is a close-up view of an exemplary arrangement of remote terminals.
Figure 5:
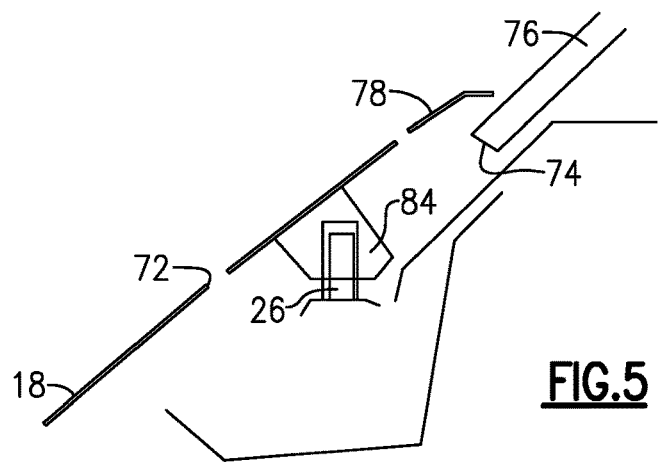
FIG. 5 is a cross-sectional view taken along line 5-5 from FIG. 4, and further illustrates an exemplary arrangement of remote terminals.

FIGS. 4 and 5 illustrate detail of an example arrangement of the location of the remote terminals 16. As shown, the remote terminals 16 are arranged in a recess 36 which is selectively covered by a cover 38. The recess 36 is arranged rearward of a rear edge 72 of the hood 18 and forward of a front edge 74 of a windshield 76. The recess 36 is beneath a leaf screen 78, in this example. The cover 38 is configured to pivot along an axis defined by a side edge 80 of the recess via a hinge 82. A water guard 84 projects from a bottom of the cover 38 and is configured to seal over the remote positive and negative terminals 24, 26 to protect them from moisture. The water guard 84 may be made of an elastomeric material such as rubber, whereas the remainder of the cover 38 may be made of a relatively harder plastic. The cover 38, when closed, may be flush with the hood 18 and the leaf screen 78 so as to provide an aesthetically pleasing appearance. The cover 38 may be manually opened by a user pulling or pressing on the cover 38.

It should be understood that terms such as "about," "substantially," and "generally" are not intended to be boundaryless terms, and should be interpreted consistent with the way one skilled in the art would interpret those terms. It should also be understood that directional terms such as "forward," "rear," "side," etc., are used herein relative to the normal operational attitude of a vehicle for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
a battery including battery terminals;
remote terminals electronically connected to the battery terminals so as to prevent electronic tampering with the battery via the remote terminals;
a sensor configured to generate an output indicative of a direction of current flowing between the battery terminals and the remote terminals;
a controller electronically connected to the sensor, wherein the controller is configured to perform at least one step when the output from the sensor indicates current is flowing out of the battery via the remote terminals,
wherein the at least one step includes issuing a prompt informing a user that current is flowing out of the battery, and receiving an input from the user regarding whether discharging of the battery is authorized, and
wherein, when the controller receives an input indicating that discharging of the battery is not authorized, the at least one step includes one or more of (1) activating an alarm of the motor vehicle, (2) recording images of an area around the vehicle, (3) sending an alert to a user, and (4) sending an alert to authorities.

2. The motor vehicle as recited in claim 1, wherein the sensor is a Hall effect sensor.

3. The motor vehicle as recited in claim 1, wherein, when the controller receives an input indicating that discharging of the battery is authorized, the controller monitors a state of charge of the battery relative to a low state of charge threshold.

4. The motor vehicle as recited in claim 3, wherein, when the state of charge of the battery meets or falls below the threshold, the controller is configured to perform at least one of (1) issuing a prompt to a user indicating a low battery state of charge and (2) electronically disconnecting the remote terminals from the battery terminals.

5. The motor vehicle as recited in claim 1, further comprising an electronic circuit between the remote terminals and the battery terminals, wherein the electronic circuit is configured to prevent backfeeding of current from the battery to the remote terminals and protect the battery from a voltage spike.

6. The motor vehicle as recited in claim 5, wherein:
the electronic circuit includes a diode configured to prevent backfeeding of current from the battery to the remote terminals, and
the electronic circuit includes at least one electronic component configured to protect the battery from a voltage spike.

7. The motor vehicle as recited in claim 6, wherein the at least one electronic component configured to protect the battery from a voltage spike includes at least one of a circuit breaker and a Zener diode.

8. The motor vehicle as recited in claim 7, wherein:
the battery terminals includes a positive terminal and a negative terminal,
the remote terminals includes a remote positive terminal and a remote negative terminal,
the remote positive terminal is electronically connected to a first node of the electronic circuit via a first branch,
a first circuit breaker is arranged in the first branch,
the diode configured to prevent backfeeding of current from the battery is arranged in a second branch between the first node and the positive terminal of the battery,
the negative terminal of the battery is electronically connected to a second node via a third branch,
a second circuit breaker is arranged in the third branch,
the first and second nodes are connected by a fourth branch including a Zener diode configured to direct current to ground without flowing to the battery when a Zener voltage is exceeded,
the Zener voltage exceeds the battery voltage.

9. The motor vehicle as recited in claim 1, wherein the vehicle is configured to be jump started via the remote terminals.

10. The motor vehicle as recited in claim 1, further comprising a cover configured to move between an open position and a closed position, wherein the remote terminals are arranged in a recess beneath the cover.

11. The motor vehicle as recited in claim 10, wherein the cover is arranged adjacent a rear edge of a hood of the motor vehicle.

12. A motor vehicle, comprising:
a battery including battery terminals;
remote terminals electronically connected to the battery terminals so as to prevent electronic tampering with the battery via the remote terminals;
a sensor configured to generate an output indicative of a direction of current flowing between the battery terminals and the remote terminals;
a controller electronically connected to the sensor, wherein the controller is configured to perform at least one step when the output from the sensor indicates current is flowing out of the battery via the remote terminals; and
a switch between the remote terminals and the battery terminals, wherein the at least one step includes opening the switch to electronically disconnect the remote terminals and the battery terminals.

13. The motor vehicle as recited in claim 12, wherein the at least one step includes determining whether a user of the vehicle is within a predetermined range of the vehicle.

14. The motor vehicle as recited in claim 13, wherein the controller determines whether the user is within the predetermined range of the vehicle by locating a mobile device of the user or a keyfob.

15. A method, comprising:
preventing electronic tampering with a battery via remote terminals electronically connected to terminals of the battery, wherein the preventing step includes one or both of: (1) preventing backfeeding of current from the battery to the remote terminals and (2) protecting the battery from a voltage spike.

* * * * *